United States Patent
Rahman

(10) Patent No.: US 7,984,342 B2
(45) Date of Patent: Jul. 19, 2011

(54) SYSTEM AND METHOD FOR MPEG CRC ERROR BASED VIDEO NETWORK FAULT DETECTION

(75) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 301 days.

(21) Appl. No.: 12/241,690

(22) Filed: Sep. 30, 2008

(65) Prior Publication Data

US 2010/0083060 A1    Apr. 1, 2010

(51) Int. Cl.
G06F 11/00 (2006.01)
G01R 31/28 (2006.01)
H04B 3/46 (2006.01)
H04B 1/66 (2006.01)

(52) U.S. Cl. ........ 714/704; 714/712; 714/799; 370/242; 370/252; 375/224; 375/240.12; 375/240.27

(58) Field of Classification Search .................. 714/704, 714/712, 799; 370/242, 252; 375/224.12, 375/240.27
See application file for complete search history.

(56) References Cited

U.S. PATENT DOCUMENTS

| 6,097,732 A * | 8/2000 | Jung .............................. 370/466 |
| 7,359,676 B2 * | 4/2008 | Hrastar ........................ 455/67.11 |
| 7,420,938 B2 * | 9/2008 | Scaglione et al. ............ 370/296 |
| 7,461,318 B2 * | 12/2008 | Fukae et al. .................. 714/749 |
| 7,533,326 B2 * | 5/2009 | Chambers ...................... 714/780 |
| 7,653,842 B2 * | 1/2010 | Kisela et al. ................... 714/703 |
| 2004/0037361 A1 * | 2/2004 | Gudis ....................... 375/240.27 |
| 2004/0090918 A1 * | 5/2004 | McLendon .................... 370/237 |

OTHER PUBLICATIONS

AT&T, The Technology Guide Series—Frame Relay Service in Today's Enterprise Network Environment, Aug. 4, 2000, www.techguide.com, pp. 1-48.*
Kamoun, Toward best maintenance practices in communications network management. 2005, Wiley InterScience, pp. 321-334.*

* cited by examiner

Primary Examiner — John J Tabone, Jr.

(57) ABSTRACT

Disclosed herein are systems, methods, and computer readable-media for detecting and identifying network faults. The method includes recording cyclic redundancy check (CRC) errors gathered by a data stream analyzer, if the number of CRC errors exceeds a threshold, sending a notification to an automated fault manager which (1) analyzes the number of CRC errors, (2) determines a cause of the CRC errors, and (3) takes appropriate corrective action based on the analysis. The method can further include storing CRC error measurements in a log organized by date and time, analyzing stored CRC error measurements to anticipate future CRC errors, and taking preventive action in advance of anticipated future CRC errors. The automated fault manager can be a rule-based fault/performance management system. The notification can be a Simple Network Management Protocol (SNMP) trap. The data stream analyzer can be an MPEG transport stream analyzer. The automated fault manager can be a video provider or a part of a network management system. The threshold can be either dynamic or static and can be based on video stream priority.

17 Claims, 3 Drawing Sheets

SYSTEM AND METHOD FOR MPEG CRC ERROR BASED VIDEO NETWORK FAULT DETECTION

BACKGROUND OF THE INVENTION

1. Field of the Invention

The present invention relates to video playback and more specifically to detecting and identifying faults during video playback.

2. Introduction

The TR 101 290 guideline identifies major fault measurement parameters, such as CRC errors, that are critical to the health and performance of an MPEG transfer stream. However, the guideline provides no dynamic real time method or logic to isolate and find the underlying cause of the major fault measurements. Currently, video networks with conform to the TR 101 290 guideline (such as in AT&Ts U-Verse) observe these measurements but do not have an automatic process in place to do anything with them. One current approach to fault management is to manually troubleshoot the root cause of major faults with MPEG analyzers, but this approach is slow and inefficient. This approach involves human intervention which is expensive and error prone. Further, the number of major faults scales linearly with the number of MPEG transfer streams. In a production environment where thousands or hundreds of thousands of data streams are transmitted, such an approach quickly becomes unmanageable.

MPEG CRC errors identify corrupt data in an MPEG program specific information table such as the program map table (PMT) and program association table (PAT). If PAT is missing then a decoder can do nothing; no MPEG video stream is decodable. The result of this is macroblocks or a blackout. A macroblock is a 16×16 block of pixels in a video. When data is not decodable, the macroblock is either not updated or not displayed at all, leading to a block of pixels that is out of sync with the rest of the video. Viewers of the video notice such macroblocks or blackouts very easily because they interrupt the motion and picture of the video. Similarly, program data is not decodable without PMT, which leads to macroblocking or blackout or other decoding problems.

Accordingly, what is needed in the art is a way to automatically isolate and resolve faults in network data streams.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for detecting and identifying network faults. The method includes recording cyclic redundancy check (CRC) errors gathered by a data stream analyzer, if the number of CRC errors exceeds a threshold, sending a notification to an automated fault manager which (1) analyzes the number of CRC errors, (2) determines a cause of the CRC errors, and (3) takes appropriate corrective action based on the analysis. The method can further include storing CRC error measurements in a log organized by date and time, analyzing stored CRC error measurements to anticipate future CRC errors, and taking preventive action in advance of anticipated future CRC errors. The automated fault manager can be a rule-based fault/performance management system. The notification can be a Simple Network Management Protocol (SNMP) trap. The data stream analyzer can be an MPEG transport stream analyzer. The automated fault manager can be a video provider or a part of a network management system. The threshold can be either dynamic or static and can be based on video stream priority.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
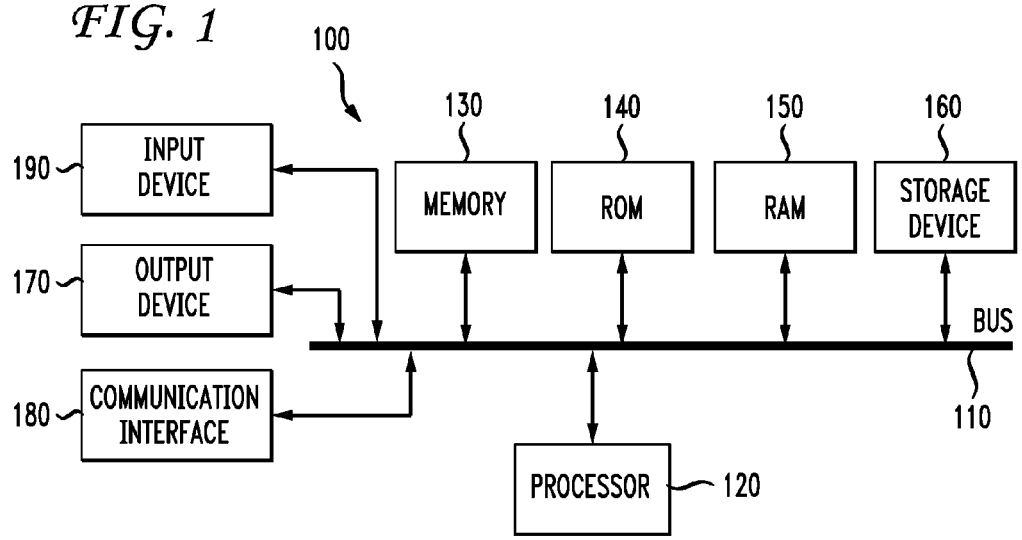
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

A cyclic redundancy check (CRC) is a way to detect errors in data streams. It is a type of mathematical function performed on a data stream to obtain a result. One commonly used result is a 32 bit integer. The TR 101 290 guideline defines CRC errors in the context of MPEG transfer streams, but other data streams may or may not have official definitions of CRC errors. Each data stream implementation can use its own algorithm for calculating CRCs and detecting errors. A CRC error is an indication that the data in the stream has been altered in some way from its original form. Transmission errors and intentional alterations are two examples of sources of changes in the data stream. While a CRC error indicates that the data is altered, lack of a CRC error does not guarantee data integrity. Due to the nature of most CRC algorithms, data can be intentionally altered to a limited extent without changing the CRC result.

Figure 2:
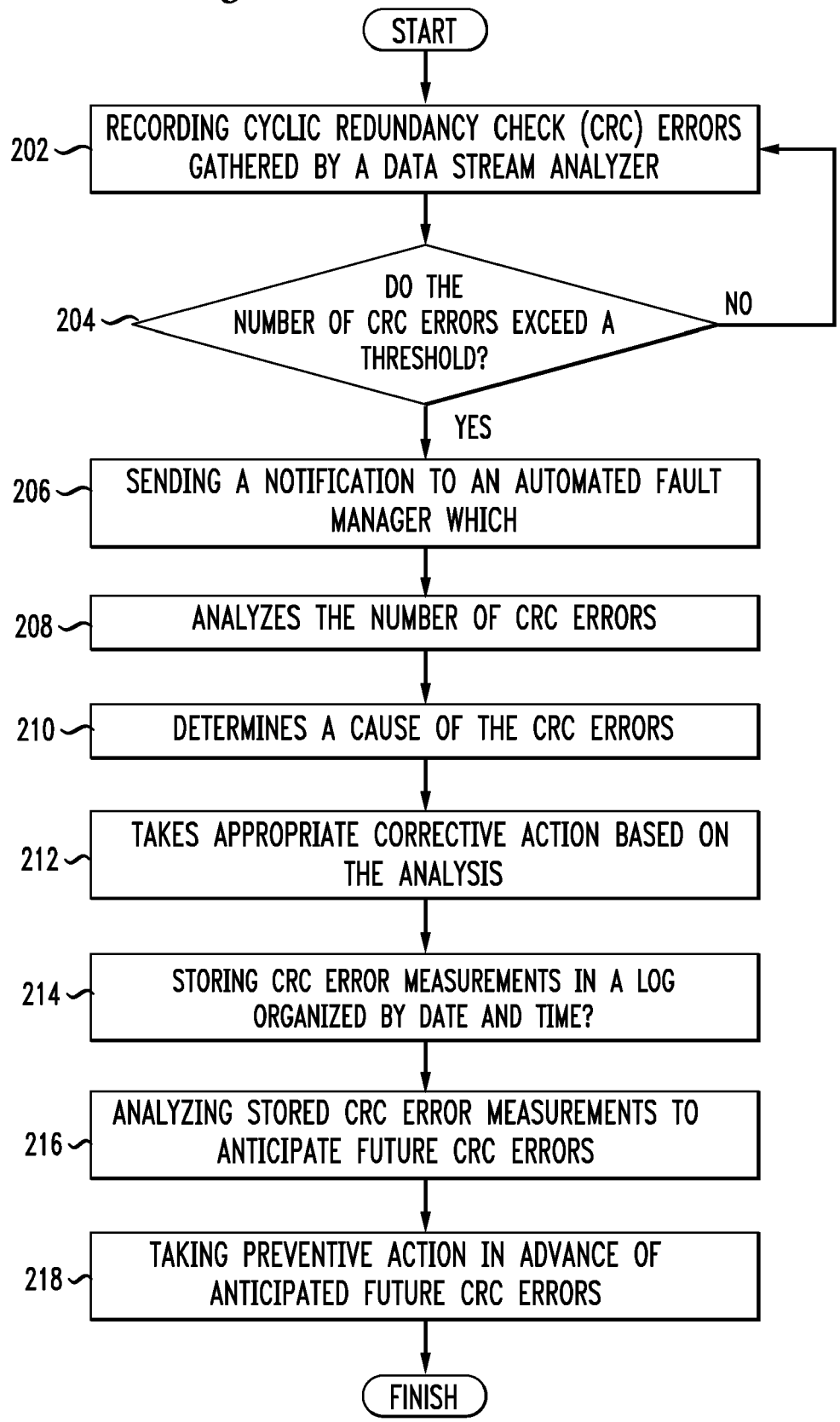
FIG. 2 illustrates an example method embodiment.

Having disclosed a basic system and some fundamental concepts, the disclosure turns to the exemplary method embodiment. The method is discussed in terms of the system for clarity. FIG. 2 illustrates an example method embodiment. The method includes recording cyclic redundancy check (CRC) errors gathered by a data stream analyzer (202). The data stream analyzer can be an MPEG transport stream analyzer.

Next the method includes a conditional check if the number of CRC errors exceeds a threshold (204). If the number of CRC errors does not exceed the threshold, the method goes back 202 until the threshold is exceeded. If the number of CRC errors exceeds the threshold, the method sends a notification to an automated fault manager (206). The automated fault manager can be a rule-based fault/performance management system. The notification can be a Simple Network Management Protocol (SNMP) trap. The threshold can be either dynamic or static and can be based on video stream priority.

The automated fault manager first analyzes the number of CRC errors (208), determines a cause of the CRC errors (210), and takes appropriate corrective action based on the analysis (212). The automated fault manager can be a video provider or a part of a network management system. Some example corrective actions are coding data with a higher priority, resending packets, throttling competing streams, allocating more bandwidth, sending packets through a different network path, sending packets from an alternate source, etc. A corrective action can be any combination or blend of single corrective actions, such as sending packets from a different source as well as allocating more bandwidth and coding the data with a higher priority.

The method can further include storing CRC error measurements in a log organized by date and time (214), analyzing stored CRC error measurements to anticipate future CRC errors (216), and taking preventive action in advance of anticipated future CRC errors (218). Preventive actions are generally similar to corrective actions. Preventive actions can also include shifting or replicating the source of the data closer to the intended destination, limiting the bandwidth of competing data streams, provisioning additional hardware resources for the anticipated CRC errors, etc.

Figure 3:
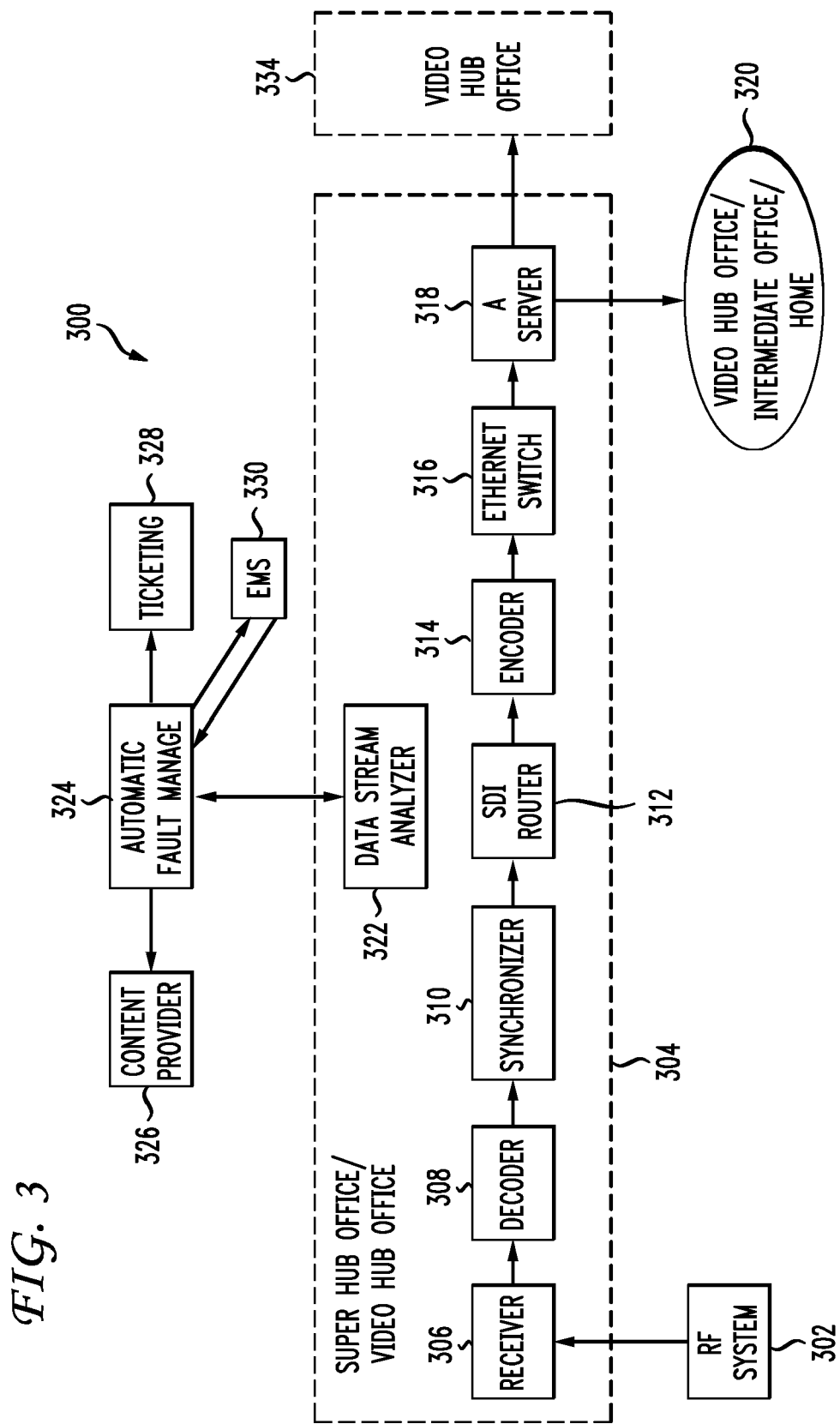
FIG. 3 illustrates an example automatic fault manager.

FIG. 3 illustrates an example automatic fault manager 300. The radio frequency system 302 transmits a data stream to the super hub office/video hub office 304. The data stream can transmit any kind of data, but is discussed in terms of an MPEG video stream. The super hub office/video hub office 304 is exemplary. Other configurations for processing and/or retransmitting data streams exist and can be used in connection with the principles of the invention. A receiver 306 accepts the data stream and passes it to a decoder 308 for decoding. The decoded data stream is passed to a synchronizer 310, then a serial digital interface (SDI) or other router 312. The SDI router passes the data stream to an encoder 314 which encodes the data stream in another format. The encoding can be in preparation for broadcast, rebroadcast, further processing, or some other purpose. The encoder 314 can also include digital rights management (DRM) features in the encoded data stream. The encoder 314 transmits the encoded data stream through an Ethernet switch 316 or other network device to a server 318. The server can be a single server, a cluster of servers, a virtualized server, etc. The server can integrate some or all of the components in the super hub office, such as the receiver 306, decoder 308, synchronizer 310, etc. The server can transmit the encoded data stream to a video hub office, intermediate office, or directly to home viewers 320. The server can transmit the data stream via Ethernet, coaxial cable, satellite broadcast, wifi, wimax, 3G, or other network technology now existing or yet to be developed. These components and modules are exemplary. Other configurations exist for transmitting data streams, such as an MPEG transfer stream, streaming audio, Voice over IP, etc., over a network and are also suited for use consistent with the principles of the invention. In addition to transmitting encoded data "down" to other offices and homes, the system can transmit encoded data "across" to other super hub offices/video hub offices 334 for rebroadcast or retransmission to other homes, etc. A network of super hub offices can communicate with each other. In this case, the system can coordinate and analyze collected CRC errors from each super hub office in the network.

A data stream analyzer 322 can monitor the overall data stream and each step in the super hub office/video hub office 304. One example of a data stream analyzer is an MPEG transport stream analyzer. The data stream analyzer detects and counts CRC errors or other types of errors in the data stream. When the number of CRC errors or other types of errors crosses a threshold, the data stream analyzer notifies the automated fault manager 324. The threshold can be dynamic or static. A dynamic threshold can be based, for example, on video stream priority, time of day, the number of CRC errors already detected in a particular stream, a viewer profile, a price paid to access the data stream, etc.

The notification can be a simple network management protocol (SNMP) trap. The data stream analyzer 322 can also send a list of the CRC errors and any other data associated with the CRC errors to the automatic fault manager 324. The automatic fault manager can notify the content provider 326 of the CRC errors. The automatic fault manager can also send a notification to a ticketing module 328. In one aspect, the ticketing module serves as a log of the times when CRC errors cross over the established threshold. The ticketing module can also serve to inform human network operators of the activities and health of the data stream generally. The automatic fault manager 324 can also interface with an Element Management System (EMS) 330 that collects alarms from different devices and sends these alarms to the rule based FM system, such as the automatic fault manager 324. The automatic fault manager 324 can be incorporated with a video provider or with a network management system.

The automatic fault manager 324 can further take corrective action to fix the source of the CRC errors. Some corrective actions are instructing the content provider to code the data stream with a higher priority, re-requesting missing packets, throttling competing data streams, allocating more bandwidth, sending packets through a different network path, sending packets from an alternate source, etc. The automatic fault manager 324 can extend corrective action into preventive action by storing CRC error measurements in a log organized by date and time, analyzing stored CRC error measurements to anticipate future CRC errors, and taking preventive action in advance of anticipated future CRC errors. Preventive actions can include any of the corrective actions as well as shifting or replicating the source of the data closer to the intended destination, limiting the bandwidth of competing data streams in advance, provisioning additional hardware resources for the anticipated CRC errors, etc.

Any of the components discussed and shown in FIG. 3 can be combined and/or integrated with other components. Equivalents can replace nearly any of the shown components; the principles of the invention are not limited to this exact configuration.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to any network data streams where CRC errors are collected, such as IPTV providers. Those skilled in the art will readily recognize various modifications and changes that may be made to the present invention without following the example embodiments and applications illustrated and described herein, and without departing from the true spirit and scope of the present invention.

I claim:

1. A method of detecting and identifying network faults, the method comprising:
   recording cyclic redundancy check errors gathered by a data stream analyzer to yield recorded cyclic redundancy check errors;
   if a number of cyclic redundancy check errors exceeds a threshold, sending a notification to an automated fault manager which:
   (1) accesses and analyzes the recorded cyclic redundancy check errors to yield an analysis;
   (2) determines a cause of the cyclic redundancy check errors; and
   (3) takes corrective action based on the analysis, the corrective action being associated with a change in how data packets are transmitted through a network;
   storing cyclic redundancy check error measurements in a log organized by date and time to yield stored cyclic redundancy check error measurements;
   analyzing the stored cyclic redundancy check error measurements to anticipate future cyclic redundancy check errors; and
   taking preventive action of anticipated future cyclic redundancy check errors, wherein the preventative action relates to an instruction to a content provider to code data packets input to the network such that the data packets get transmitted through the network in a different way than the data packets would be transmitted through the network prior to the instruction.

2. The method of claim 1, wherein the automated fault manager is a rule-based fault/performance management system.

3. The method of claim 1, wherein the notification is a Simple Network Management Protocol trap.

4. The method of claim 1, wherein the data stream analyzer is an MPEG transport stream analyzer.

5. The method of claim 1, wherein the automated fault manager is a video provider.

6. The method of claim 1, wherein the automated fault manager is part of a network management system.

7. The method of claim 1, wherein the threshold is one of dynamic and static.

8. The method of claim 1, wherein the threshold is based on video stream priority.

9. A system for detecting and identifying network faults, the system comprising:
   a first module that controls a processor to record cyclic redundancy check errors gathered by a data stream analyzer to yield recorded cyclic redundancy check errors;
   a second module that controls the processor to send a notification to an automated fault manager if the number of cyclic redundancy check errors exceeds a threshold, wherein the automated fault manager:
   (1) accesses and analyzes the recorded cyclic redundancy check errors to yield an analysis;
   (2) determines a cause of the cyclic redundancy check errors; and
   (3) takes corrective action based on the analysis, the corrective action being associated with a change in how data packets are transmitted through a network;
   a third module that controls the processor to store cyclic redundancy check error measurements in a log organized by date and time to yield stored cyclic redundancy check error measurements;
   a fourth module that controls the processor to analyze the stored cyclic redundancy check error measurements to anticipate future cyclic redundancy check errors; and
   a fifth module that controls the processor to take preventive action of anticipated future cyclic redundancy check errors, wherein the preventative action relates to an instruction to a content provider to code data packets input to the network such that the data packets get transmitted through the network in a different way than the data packets would be transmitted through the network prior to the instruction.

10. The system of claim 9, wherein the automated fault manager is a rule-based fault/performance management system.

11. The system of claim 9, wherein the notification is a Simple Network Management Protocol trap.

12. The system of claim 9, wherein the data stream analyzer is an MPEG transport stream analyzer.

13. The system of claim 9, wherein the automated fault manager is a video provider.

14. The system of claim 9, wherein the automated fault manager is part of a network management system.

15. The system of claim 9, wherein the threshold is based on video stream priority.

16. A tangible computer-readable medium storing a computer program having instructions for detecting and identifying network faults, the instructions comprising:
   recording cyclic redundancy check errors gathered by a data stream analyzer;
   if a number of cyclic redundancy check errors exceeds a threshold, sending a notification to an automated fault manager which:
   (1) accesses and analyzes the recorded cyclic redundancy check errors to yield an analysis;
   (2) determines a cause of the cyclic redundancy check errors; and
   (3) takes corrective action based on the analysis, the corrective action being associated with a change in how data packets are transmitted through a network;
   storing cyclic redundancy check error measurements in a log organized by date and time to yield stored cyclic redundancy check error measurements;
   analyzing the stored cyclic redundancy check error measurements to anticipate future cyclic redundancy check errors; and
   taking preventive action of anticipated future cyclic redundancy check errors, wherein the preventative action relates to an instruction to a content provider to code data packets input to the network such that the data packets get transmitted through the network in a different way than the data packets would be transmitted through the network prior to the instruction.

17. The tangible computer-readable medium of claim 16, wherein the automated fault manager is a rule-based fault/performance management system.

* * * * *